United States Patent
Kennedy et al.

(10) Patent No.: US 6,698,409 B1
(45) Date of Patent: Mar. 2, 2004

(54) ENGINE SPEED-BASED MODIFICATION OF EXHAUST GAS RECIRCULATION DURING FUELING TRANSIENTS

(75) Inventors: Michael P. Kennedy, Wheaton, IL (US); Michael J. McNulty, Lombard, IL (US); James T. Beaucaire, Glen Ellyn, IL (US); David V. Rodgers, Bloomingdale, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/314,671

(22) Filed: Dec. 9, 2002

(51) Int. Cl.$^7$ ............................ F02M 25/07; F02D 41/04
(52) U.S. Cl. .................. 123/568.21; 123/492; 701/108
(58) Field of Search ................................ 123/295, 305, 123/299, 478, 480, 492, 493, 568.21, 568.22, 568.23, 568.27; 701/103, 104, 105, 108; 60/602, 605.2

(56) References Cited

U.S. PATENT DOCUMENTS

| | | | |
|---|---|---|---|
| 4,255,789 A | * | 3/1981 | Hartford et al. ............ 701/108 |
| 4,886,027 A | * | 12/1989 | Orrell et al. ................ 123/478 |
| 5,273,019 A | * | 12/1993 | Matthews et al. ...... 123/568.21 |
| 5,682,864 A | * | 11/1997 | Shirakawa ............. 123/568.21 |
| 6,003,496 A | * | 12/1999 | Maloney ..................... 123/480 |
| 6,128,902 A | * | 10/2000 | Kolmanovsky et al. .... 60/605.2 |
| 6,363,317 B1 | * | 3/2002 | Druzhinina et al. ........ 701/104 |
| 6,401,700 B2 | | 6/2002 | Balekai et al. |
| 2003/0140906 A1 | * | 7/2003 | Dollmeyer et al. .... 123/568.22 |

FOREIGN PATENT DOCUMENTS

JP          2003193875 A  *  7/2003  ................ 60/605.2

* cited by examiner

*Primary Examiner*—Willis R. Wolfe
(74) *Attorney, Agent, or Firm*—Dennis Kelly Sullivan; Susan L. Lukasik; Jeffrey P. Calfa

(57) ABSTRACT

Engine speed data N and engine fueling data MFDES are processed by a strategy (22) that multiplies (28) fueling transient data MFDES TRANSIENT and speed-based modifier data EGR_N_TRANS_MULT to develop speed-based fueling transient data. The speed-based fueling transient data is then processed according to a function (32) that correlates values of a fueling transient modifier with values of speed-based fueling transient data to develop exhaust gas recirculation modifier data. The exhaust gas recirculation modifier data and basic exhaust gas recirculation data are multiplied (34) to develop modified exhaust gas recirculation data, and exhaust gas is recirculated in accordance with the modified exhaust gas recirculation data. Using engine speed as a determinant of the extent to which the basic EGR rate should be modified during a fueling transient enables better control over certain exhaust emissions over certain speed ranges.

14 Claims, 4 Drawing Sheets

ENGINE SPEED-BASED MODIFICATION OF EXHAUST GAS RECIRCULATION DURING FUELING TRANSIENTS

FIELD OF THE INVENTION

This invention relates to internal combustion engines for propelling motor vehicles. More specifically it relates to control of exhaust gas recirculation, particularly during fueling transients.

BACKGROUND OF THE INVENTION

Commonly owned U.S. Pat. No. 6,401,700 issued Jun. 11, 2002, discloses an engine control system that modifies exhaust gas recirculation (EGR) during fueling transients. A basic EGR rate is obtained from a map or table using current engine speed and current engine fueling. During a fueling transient the basic EGR rate is modified by an EGR transient multiplier, and the modified basic EGR rate is used instead of the basic EGR rate to control an EGR valve through which exhaust gas is recirculated. The value of the EGR transient multiplier is determined by a characteristic of the fueling transient, such as the severity of the transient.

SUMMARY OF THE INVENTION

The present invention relates to an improvement in EGR control strategy during fueling transients. Rather than utilizing only a characteristic of a fueling transient to determine how much the basic EGR rate should be modified during the transient, the invention introduces engine speed as an additional factor. By also using engine speed as a determinant of the extent to which the basic EGR rate should be modified during a fueling transient, it becomes possible to obtain better control over certain exhaust emissions over certain speed ranges. In particular, the invention can inhibit modification of the basic EGR rate at certain engine speeds without significant adverse consequences on some exhaust emission products, when certain fueling transients would otherwise be effective to modify the basic EGR rate in a manner that would cause increased generation of other exhaust emission products.

A specific example of the invention in one particular diesel engine inhibits modification of the basic EGR rate during fueling transients that, in the absence of engine speed as a factor, would modify the basic EGR rate when engine speed exceeds a selected speed, 2000 rpm in this example. In that diesel engine, the ability to inhibit modification of the basic EGR rate when the engine runs at relatively higher speeds can reduce the generation of oxides of nitrogen ($NO_x$) without significant consequences on the generation of smoke at those speeds.

Principles of the invention are more encompassing than the example just given. There need not be merely an engine speed threshold above or below which the basic EGR rate is inhibited during a fueling transient. Rather, the rate can be inhibited whenever engine speed falls within one or more defined speed "windows" during a fueling transient, but otherwise not inhibited during a fueling transient. An example of this would be one that comprises a window at 2000–2400 rpm and a window at 2600–2800 rpm so that if a fueling transient were to occur while the engine was running at a speed within one of the windows, the basic EGR rate would be inhibited, but if the engine were running at any other speed when the fueling transient occurred, the basic EGR rate would not be inhibited.

Accordingly, one generic aspect of the present invention relates to an internal combustion engine comprising a control system comprising a processor for processing various data to develop data for control of engine fueling and of exhaust gas recirculation. The processor processes engine speed data and engine fueling data according to a function that correlates values of basic exhaust gas recirculation with values of engine speed and engine fueling to develop basic exhaust gas recirculation data. The processor processes engine speed data according to a function that correlates values of a speed-based modifier with values of engine speed to develop speed-based modifier data, and also processes engine fueling data to develop fueling transient data. The processor further processes the fueling transient data and the speed-based modifier data to develop speed-based fueling transient data, processes the speed-based fueling transient data according to a function that correlates values of a fueling transient modifier with values of speed-based fueling transient data to develop exhaust gas recirculation modifier data, and processes the exhaust gas recirculation modifier data and the basic exhaust gas recirculation data to develop modified exhaust gas recirculation data. The processor then causes exhaust gas to be recirculated in accordance with the modified exhaust gas recirculation data.

Another generic aspect relates to a method for modifying exhaust gas recirculation in an internal combustion engine during fueling transients. The method comprises: a) processing engine speed data and engine fueling data according to a function that correlates values of basic exhaust gas recirculation with values of engine speed and engine fueling to develop basic exhaust gas recirculation data, b) processing engine speed data according to a function that correlates values of a speed-based modifier with values of engine speed to develop speed-based modifier data, c) processing engine fueling data to develop fueling transient data, d) processing fueling transient data and speed-based modifier data to develop speed-based fueling transient data, e) processing speed-based fueling transient data according to a function that correlates values of a fueling transient modifier with values of fueling transient data to develop exhaust gas recirculation modifier data, f) processing the exhaust gas recirculation modifier data and basic exhaust gas recirculation data to develop modified exhaust gas recirculation data, and g) causing exhaust gas to be recirculated in accordance with the modified exhaust gas recirculation data.

Still other generic aspects relate to an internal combustion engine comprising a control system comprising a processor for processing various data to develop data for control of engine fueling and of exhaust gas recirculation, and to a corresponding method. The processor a) processes current engine speed data and current engine fueling data to develop basic exhaust gas recirculation data correlated with current engine speed and current engine fueling, b) processes current engine fueling data and current engine speed data to distinguish fueling transients that call for modification of the basic exhaust gas recirculation data, and c) when engine speed is within one selected speed range and the processing of engine fueling data and engine speed data discloses a fueling transient that calls for modification of the basic exhaust gas recirculation data, modifies the basic exhaust gas recirculation data by exhaust gas recirculation modifier data to develop modified exhaust gas recirculation data, and causes the modified exhaust gas recirculation data to control exhaust gas recirculation, and d) when engine speed is within another selected speed range and the processing of engine fueling data and engine speed data discloses a fueling transient that would otherwise call for modification of the basic exhaust gas recirculation data, inhibits modification of the basic exhaust gas recirculation data by exhaust gas recirculation modifier data, and causes the basic exhaust gas recirculation data to control exhaust gas recirculation.

The foregoing, along with further features and advantages of the invention, will be seen in the following disclosure of a presently preferred embodiment of the invention depicting the best mode contemplated at this time for carrying out the invention. This specification includes drawings, now briefly described as follows.

DESCRIPTION OF THE PREFERRED EMBODIMENT

Figure 1:
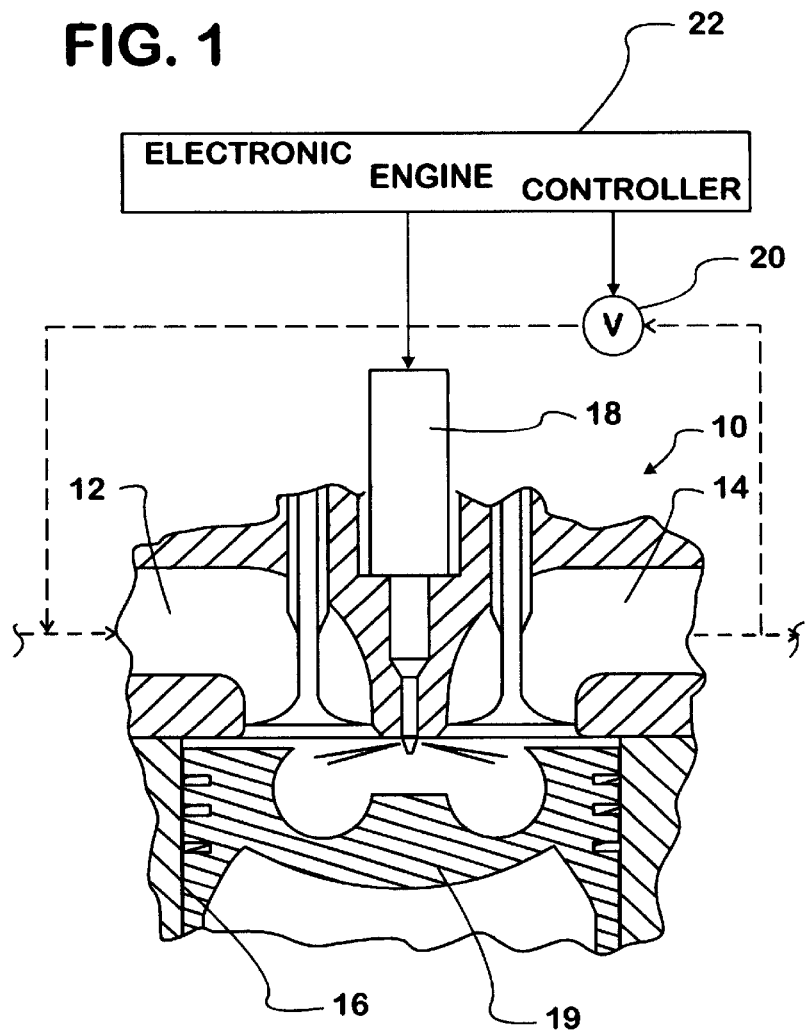
FIG. 1 is a general schematic diagram of an exemplary internal combustion engine in accordance with principles of the present invention.

FIG. 1 shows an exemplary internal combustion engine 10 having an intake system 12 through which air for combustion enters the engine and an exhaust system 14 through which exhaust gas resulting from combustion exits the engine. Engine 10 is, by way of example, a diesel engine having cylinders 16 into which fuel is injected by fuel injectors 18 to form, with charge air introduced through intake system 12, a mixture that is combusted upon compression by pistons 19 that reciprocate within the cylinders to power the engine. Exhaust gases resulting from combustion is exhausted through exhaust system 14, but some portion is at times recirculated through an exhaust gas recirculation (EGR) system including an EGR valve 20 that is under the control of an engine control system 22. The engine control system processes various data to control the flow rate of exhaust gas through valve 20.

Figure 2:
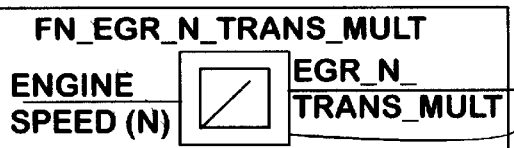
FIG. 2 is a schematic diagram of a portion of an engine control strategy embodying principles of the present invention.
Figure 2:
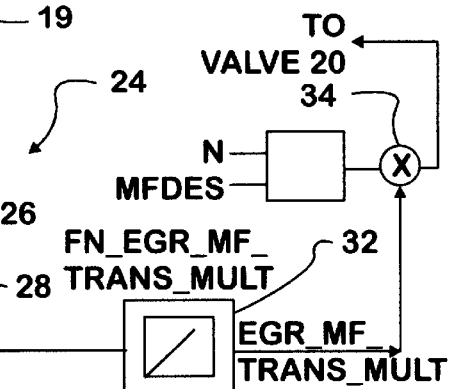
Figure 2:

In accordance with principles of the invention, control system 22 comprises one or more processors for processing various data, including engine speed data N and engine fueling data MFDES, according to a processing strategy 24 as shown more particularly in FIG. 2. The strategy comprises processing engine speed data N according to a function FN_EGR_N_TRANS_MULT (reference numeral 26). Function 26 may be a look-up table, or map, that contains values of a speed-based modifier EGR_N_TRANS_MULT correlated with values of engine speed N. As the strategy executes, a value of speed-based modifier EGR_N_TRANS_MULT corresponding to current engine speed N is provided by function 26 for use by a multiplication function 28. Multiplication function 28 multiplies the speed-based modifier value EGR_N_TRANS_MULT provided by function 26 by a factor MFDES TRANSIENT.

A value for the factor MFDES TRANSIENT is determined by processing, reference numeral 30, of fueling data MFDES. The processing occurs fast enough for an accurate measure of rate of change of engine fueling to be obtained, and it is that rate of change that serves to distinguish fueling transients, like ones that occur during engine acceleration.

The product resulting from multiplication function 28 is then processed according to a function FN_EGR_MF_TRANS_MULT (reference numeral 32). Function 32 may be a look-up table, or map, that contains values of a speed-based fueling transient modifier EGR_MF_TRANS_MULT correlated with values for fueling transients MFDES TRANSIENT. As the strategy executes, a value of speed-based fueling transient modifier EGR_N_TRANS_MULT corresponding to the calculated fueling transient is provided by function 32 for use by a multiplication function 34. Function 34 multiplies the provided value of speed-based fueling transient modifier EGR_N_TRANS_MULT by a value of basic EGR rate that has been determined on the basis of current engine speed N and current engine fueling MFDES. The basic EGR rate is premised generally on steady state engine operation at the current speed and current fueling, and may be developed in any suitably appropriate manner such as by reading from a look-up table, as in the referenced patent, or by a more sophisticated technique. The actual value of both modified and basic EGR rates may represent the position of a valve member of valve 20 that for prevailing engine conditions will achieve the desired EGR rate.

Hence, the modification provided serves in effect to adjust the basic steady state EGR rate for transient conditions occurring in the vicinity of current speed and current fueling.

A particular benefit of the strategy is illustrated by the following example. By causing the speed-based fueling transient modifier EGR_MF_TRANS_MULT to have values of zero for engine speeds in a range exceeding some selected speed, such as 2000 rpm for example, the value of MFDES_TRANSIENT will always be multiplied by zero for engine speeds in that range. By causing function 32 to provide a value of unity whenever the product from multiplication function 28 has a value of zero, the basic EGR rate will be multiplied by unity, i.e. be unchanged, whenever engine speed is within the range exceeding the selected speed. By causing function 32 to provide a value of other than unity whenever the product from multiplication function 28 has a non-zero value, the basic EGR rate will be adjusted for the fueling transient, and in this example such adjustment occurs in a speed range below the selected speed of 2000 rpm.

The invention can therefore inhibit modification of the basic EGR rate in consequence of fueling transients that in the absence of engine speed as a factor would modify the basic EGR rate when engine speed exceeds a selected speed, such as the 2000 rpm example. In a diesel engine, this can reduce the generation of oxides of nitrogen ($NO_x$) without significant consequences on the generation of smoke during acceleration.

Figure 3A:
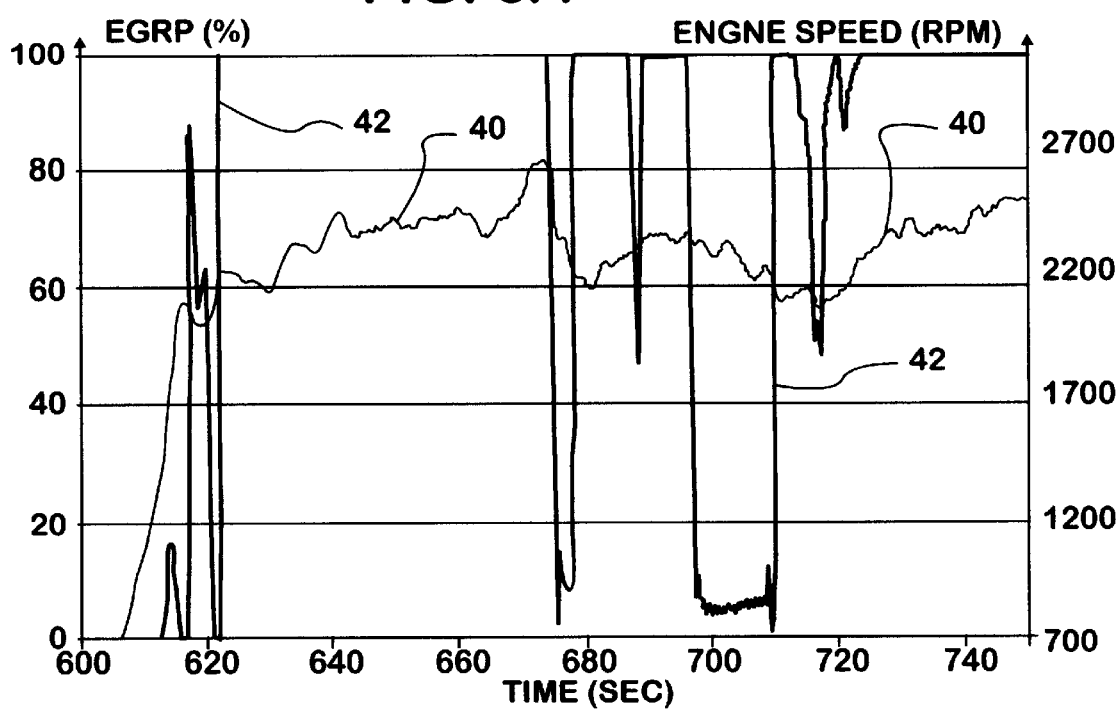
FIGS. 3A and 3B are first and second portions of a first graph plot, and FIGS. 3C and 3D first and second portions of a second graph plot, useful in explaining principles of the present invention.
Figure 3B:
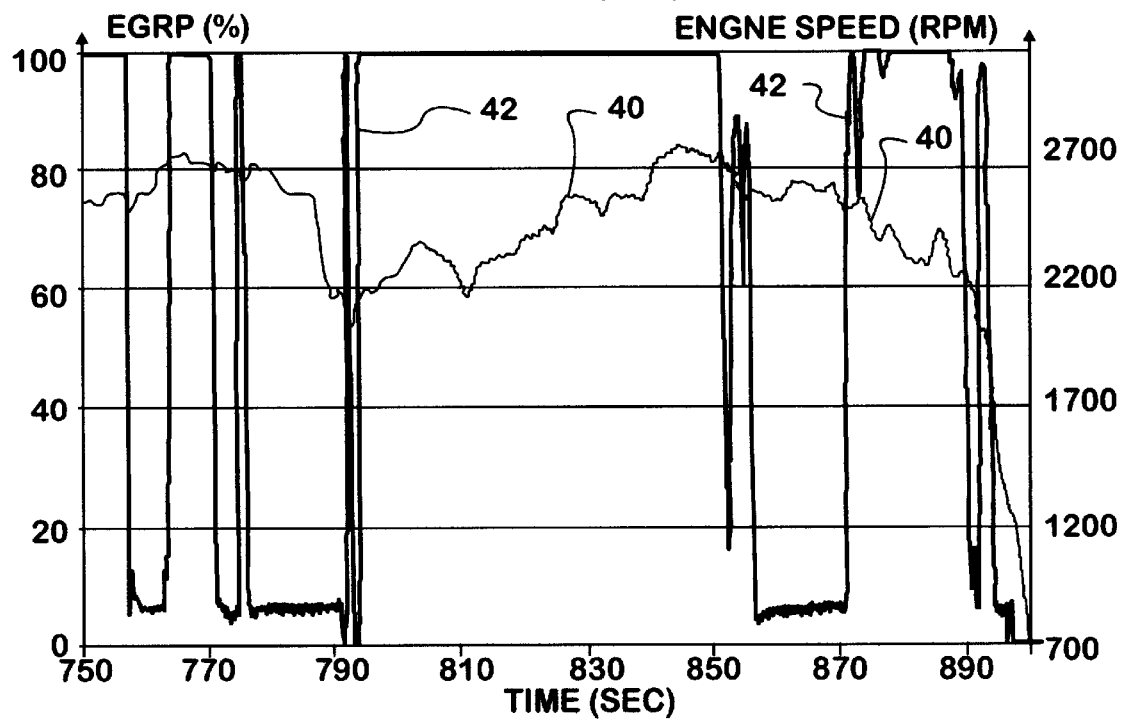
Figure 3C:
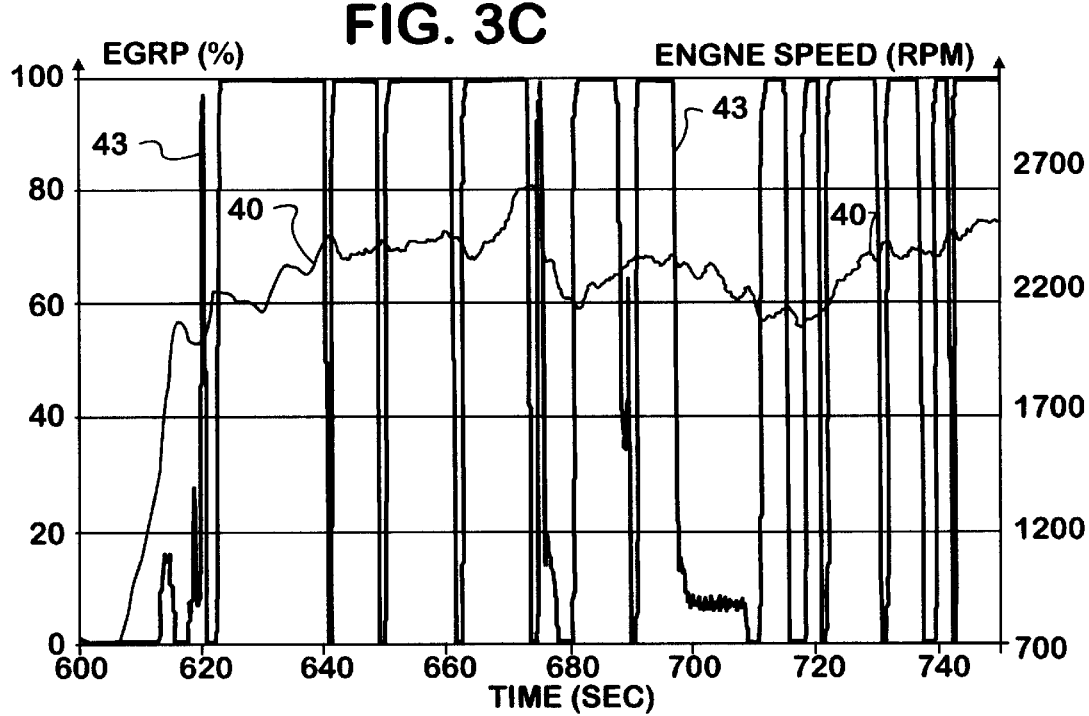
Figure 3D:
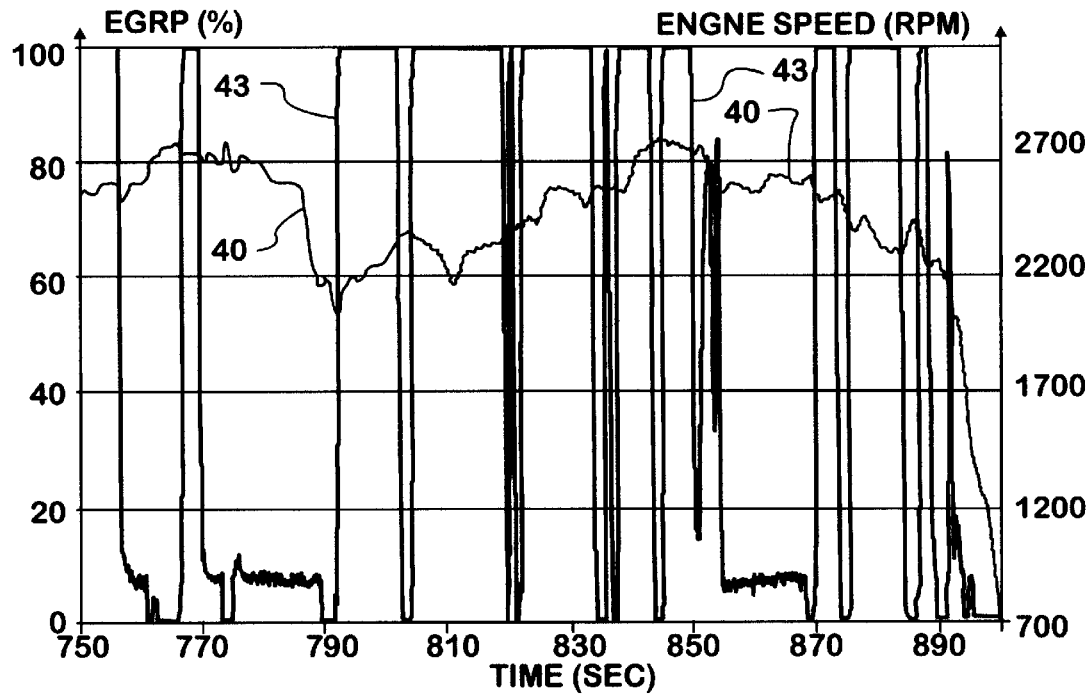
Figure 4A:
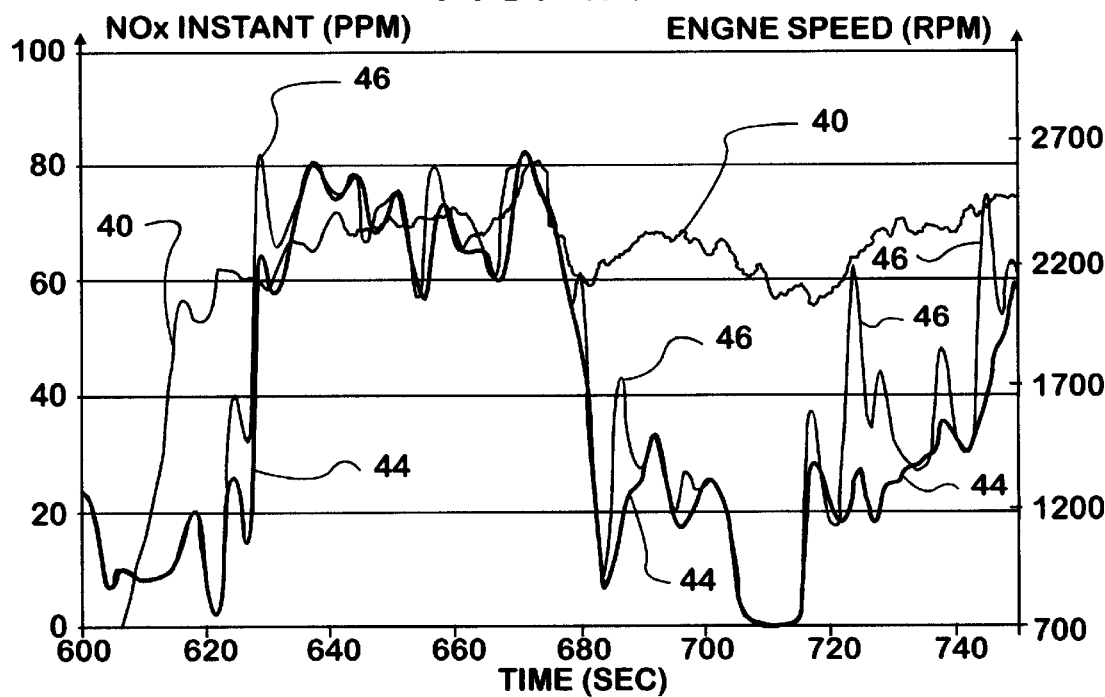
FIGS. 4A and 4B are first and second portions of a third graph plot useful in explaining principles of the present invention.

Effectiveness of the invention is illustrated by way of example with reference to the graph plots of FIGS. 3A, 3B, 3C, 3D, 4A, and 4B taken from the 600 seconds mark to the 900 seconds mark of a HOT FTP emissions cycle. That cycle is specified for transient exhaust emissions testing by the United States Environmental Protection Agency and is performed as a 1200 second test on an engine dynamometer. FIGS. 3A, 3C, and 4A span the 600 seconds mark to the 750 seconds mark, while the other three Figures span the 750 seconds mark to the 900 seconds mark. All six Figures show a trace 40 of engine speed as a function of time in a vehicle that is being accelerated shortly after 600 seconds of elapsed time. The engine is of course also being accelerated and reaches speeds ranging from about 2100 rpm to about 2700 rpm (highway speeds) until just before 900 seconds of elapsed time.

Another trace 42 in FIGS. 3A and 3B shows the extent to which valve 20 is open when the inventive strategy is not active, while a third trace 43 in FIGS. 3C and 3D shows the extent to which valve 20 is open when the inventive strategy is active. Comparison of traces 42 and 43 discloses that with the strategy active, valve 20 remains open noticeably more than when the strategy is inactive.

Figure 4B:
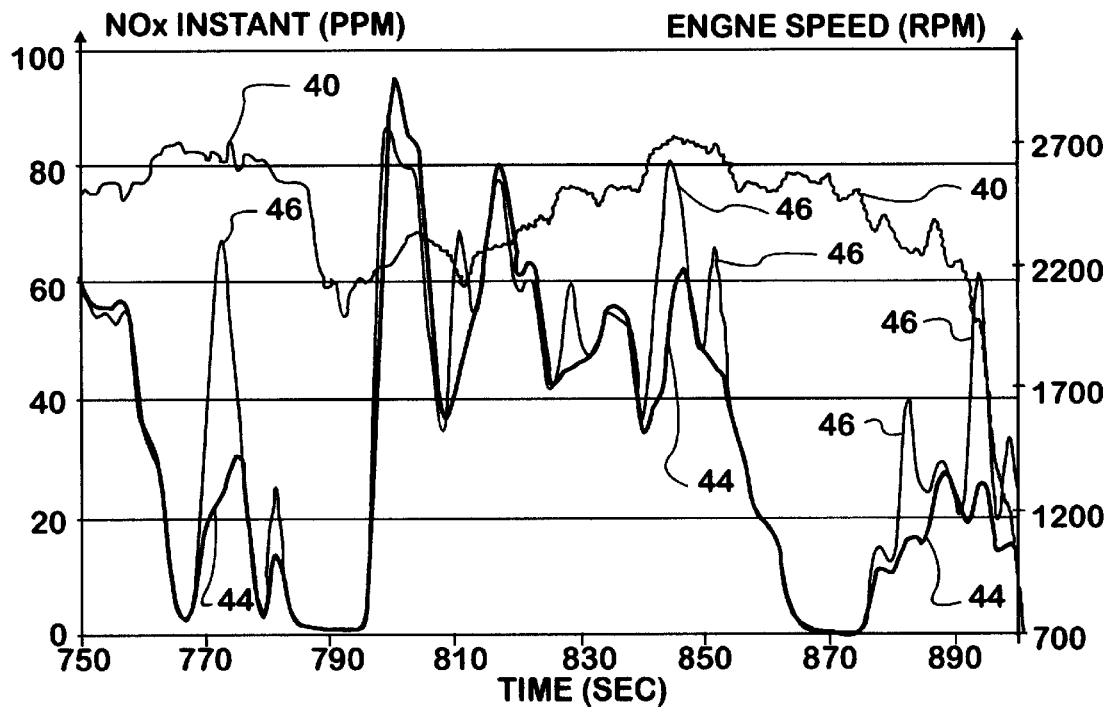

FIGS. 4A and 4B show a trace 44 that represents (NO$_x$) generation rate as a function of time with the inventive strategy active, and a trace 46 with the strategy inactive. Comparison discloses that during the time interval shown the total amount of (NO$_x$) generated, represented by the areas under the respective traces, is less when the strategy is active.

While a presently preferred embodiment of the invention has been illustrated and described, it should be appreciated that principles of the invention apply to all embodiments falling within the scope of the following claims.

What is claimed is:

1. An internal combustion engine comprising:
   a control system comprising a processor for processing various data to develop data for control of engine fueling and of exhaust gas recirculation, wherein the processor:
   a) processes engine speed data and engine fueling data according to a function that correlates values of basic exhaust gas recirculation with values of engine speed and engine fueling to develop basic exhaust gas recirculation data,
   b) processes engine speed data according to a function that correlates values of a speed-based modifier with values of engine speed to develop speed-based modifier data,
   c) processes engine fueling data to develop fueling transient data,
   d) processes the fueling transient data and the speed-based modifier data to develop speed-based fueling transient data,
   e) processes the speed-based fueling transient data according to a function that correlates values of a fueling transient modifier with values of speed-based fueling transient data to develop exhaust gas recirculation modifier data,
   f) processes the exhaust gas recirculation modifier data and the basic exhaust gas recirculation data to develop modified exhaust gas recirculation data, and
   g) causes exhaust gas to be recirculated in accordance with the modified exhaust gas recirculation data.

2. An engine as set forth in claim 1 in which the processor processes the fueling transient data and the speed-based modifier data by multiplying the fueling transient data by the speed-based modifier data.

3. An engine as set forth in claim 2 in which the function that correlates values of a speed-based modifier with values of engine speed to develop speed-based modifier data sets the value of the speed-based modifier to a value of zero for engine speeds in excess of a selected speed.

4. An engine as set forth in claim 1 including an exhaust gas recirculation valve disposed between an exhaust system and an intake system of the engine and through which exhaust gas is recirculated, and wherein the control system acts controls the valve in accordance with the modified exhaust gas recirculation data.

5. An engine as set forth in claim 1 in which the engine operates to combust fuel by compression ignition.

6. A method for modifying exhaust gas recirculation in an internal combustion engine during fueling transients, the method comprising:
   a) processing engine speed data and engine fueling data according to a function that correlates values of basic exhaust gas recirculation with values of engine speed and engine fueling to develop basic exhaust gas recirculation data,
   b) processing engine speed data according to a function that correlates values of a speed-based modifier with values of engine speed to develop speed-based modifier data,
   c) processing engine fueling data to develop fueling transient data,
   d) processing the fueling transient data and the speed-based modifier data to develop speed-based fueling transient data,
   e) processing the speed-based fueling transient data according to a function that correlates values of a fueling transient modifier with values of speed-based fueling transient data to develop exhaust gas recirculation modifier data,
   f) processing the exhaust gas recirculation modifier data and the basic exhaust gas recirculation data to develop modified exhaust gas recirculation data, and
   g) causing exhaust gas to be recirculated in accordance with the modified exhaust gas recirculation data developing speed-based modifier data according to a function that correlates values of a speed-based modifier with engine speed.

7. A method as set forth in claim 6 in which the step of processing the fueling transient data and the speed-based modifier data to develop speed-based fueling transient data comprises multiplying the fueling transient data by the speed-based modifier data.

8. A method as set forth in claim 7 in which the step of processing engine speed data according to a function that correlates values of a speed-based modifier with values of engine speed to develop speed-based modifier data comprises setting the value of the speed-based modifier to a value of zero for engine speeds in excess of a selected speed.

9. A method as set forth in claim 6 wherein the step of causing exhaust gas to be recirculated in accordance with the modified exhaust gas recirculation data comprises recirculating exhaust gas through a valve disposed between an exhaust system and an intake system of the engine and controlled in accordance with the modified exhaust gas recirculation data.

10. A method as set forth in claim 6 in which the engine operates to combust fuel by compression ignition.

11. An internal combustion engine comprising:
    a control system comprising a processor for processing various data to develop data for control of engine fueling and of exhaust gas recirculation, wherein the processor
    a) processes current engine speed data and current engine fueling data to develop basic exhaust gas recirculation data correlated with current engine speed and current engine fueling,
    b) processes current engine fueling data and current engine speed data to distinguish fueling transients that call for modification of the basic exhaust gas recirculation data, and
    c) when engine speed is within one selected speed range and the processing of engine fueling data and engine speed data discloses a fueling transient that calls for modification of the basic exhaust gas recirculation data, modifies the basic exhaust gas recirculation data by exhaust gas recirculation modifier data to develop modified exhaust gas recirculation data, and causes the modified exhaust gas recirculation data to control exhaust gas recirculation, and d) when engine speed is within another selected speed range and the processing of engine fueling data and engine speed data discloses a fueling transient that would otherwise call for modification of the basic exhaust gas recirculation data, inhibits modification of the basic exhaust gas recirculation data by exhaust gas recirculation modifier data, and instead causes the basic exhaust gas recirculation data to control exhaust gas recirculation.

12. An engine as set forth in claim 11 in which the another selected speed range comprises speeds greater than speeds within the one selected speed range.

13. A method for modifying exhaust gas recirculation in an internal combustion engine during fueling transients, the method comprising:

a) processing current engine speed data and current engine fueling data to develop basic exhaust gas recirculation data correlated with current engine speed and current engine fueling, b) processing current engine fueling data and current engine speed data to distinguish fueling transients that call for modification of the basic exhaust gas recirculation data, and c) when engine speed is within one selected speed range and the processing of engine fueling data and engine speed data discloses a fueling transient that calls for modification of the basic exhaust gas recirculation data, modifying the basic exhaust gas recirculation data by exhaust gas recirculation modifier data to develop modified exhaust gas recirculation data, and causing the modified exhaust gas recirculation data to control exhaust gas recirculation, and d) when engine speed is within another selected speed range and the processing of engine fueling data and engine speed data discloses a fueling transient that would otherwise call for modification of the basic exhaust gas recirculation data, inhibiting modification of the basic exhaust gas recirculation data by exhaust gas recirculation modifier data, and instead causing the basic exhaust gas recirculation data to control exhaust gas recirculation.

14. A method as set forth in claim 13 in which the another selected speed range comprises speeds greater than speeds within the one selected speed range.

* * * * *